US007734046B2

(12) United States Patent
Urban et al.

(10) Patent No.: US 7,734,046 B2
(45) Date of Patent: Jun. 8, 2010

(54) METHOD FOR COMMUNICATING AND CHECKING AUTHENTICATION DATA BETWEEN A PORTABLE TRANSPONDER DEVICE AND A VEHICLE READER UNIT

(75) Inventors: Volker Urban, Gummersbach (DE); Thomas Gyger, Les Ponts-de-Martel (CH)

(73) Assignee: Smartrac Technology Germany GmbH, Reichshof-Wehnrath (DE)

( * ) Notice: Subject to any disclaimer, the term of this patent is extended or adjusted under 35 U.S.C. 154(b) by 1159 days.

(21) Appl. No.: 11/275,931

(22) Filed: Feb. 6, 2006

(65) Prior Publication Data

US 2007/0174612 A1 Jul. 26, 2007

(30) Foreign Application Priority Data

Feb. 4, 2005 (EP) ................................ 05100803

(51) Int. Cl.
*H04L 9/00* (2006.01)
*H04K 1/00* (2006.01)
*H04L 9/32* (2006.01)

(52) U.S. Cl. ......................... 380/46; 380/270; 713/168; 713/189

(58) Field of Classification Search ......... 713/168–170, 713/189, 193–194; 701/1; 370/465; 345/163; 340/572.8; 250/221; 60/605.2; 380/263, 380/268, 270, 277, 44, 46
See application file for complete search history.

(56) References Cited

U.S. PATENT DOCUMENTS 4,509,093 A 4/1985 Stellberger (Continued)

FOREIGN PATENT DOCUMENTS

EP 492 692 A2 7/1992

(Continued)

*Primary Examiner*—Hosuk Song
(74) *Attorney, Agent, or Firm*—Sughrue Mion, PLLC

(57) ABSTRACT

The method enables authentication data to be communicated and checked between a transponder device (1) and a reader unit (2) of a vehicle in order to authorize access to the vehicle. The device includes a logic circuit (11), a non-volatile memory (13), an encryption and/or decryption circuit (12) and a first transmission and reception module (14, 16) of data signals ($S_D$). The reader unit includes a microprocessor unit (21), a memory (22), a random number generator (24) and a second module (23, 25) for transmitting and receiving data signals ($S_D$). A random number (RN1) generated in the reader unit is transmitted with a first encrypted function obtained using the random number and a secret key. The transponder device receives the random number and the first encrypted function. A new first encrypted function is calculated in the transponder device using a secret key identical to the secret key of the reader unit. This new first function is compared with the first received encrypted function. A second encrypted function is also calculated in the transponder device in order to be transmitted to the reader unit solely if the new first encrypted function is equal to the first received encrypted function. The validity of the second encrypted function is checked in the reader unit in order to authorize access to the vehicle. The number of bits of the random number, of the first and second encrypted functions can be configured in the transponder device and/or in the reader unit with a determined length.

7 Claims, 5 Drawing Sheets

U.S. PATENT DOCUMENTS

Figure 1:
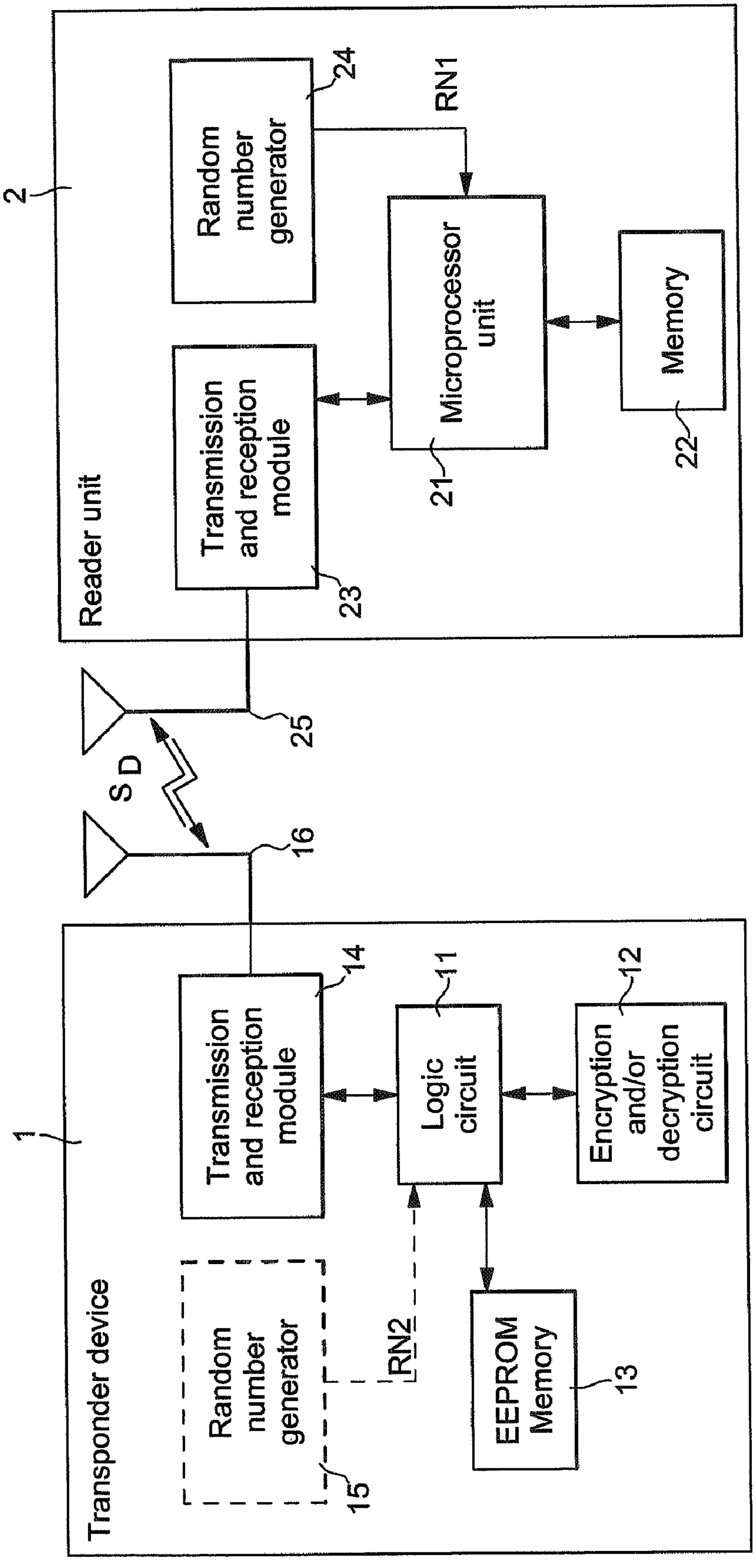

| | | | | |
|---|---|---|---|---|
| 4,799,061 | A | 1/1989 | Abraham et al. | |
| 6,075,454 | A | 6/2000 | Yamasaki | |
| 2002/0053027 | A1 | 5/2002 | Kim | |
| 2002/0053207 | A1 * | 5/2002 | Finger et al. | 60/605.2 |
| 2003/0093187 | A1 * | 5/2003 | Walker | 701/1 |
| 2004/0083368 | A1 * | 4/2004 | Gehrmann | 713/171 |
| 2004/0179547 | A1 * | 9/2004 | Kuffner et al. | 370/465 |
| 2006/0208169 | A1 * | 9/2006 | Breed et al. | 250/221 |
| 2007/0090958 | A1 * | 4/2007 | Stilp | 340/572.8 |
| 2007/0109266 | A1 * | 5/2007 | Davis et al. | 345/163 |

FOREIGN PATENT DOCUMENTS

| | | | |
|---|---|---|---|
| EP | 774 673 | A2 | 5/1997 |
| EP | 923 054 | A2 | 6/1999 |
| EP | 1 387 323 | A1 | 2/2004 |
| EP | 1 443 469 | A1 | 8/2004 |

* cited by examiner

METHOD FOR COMMUNICATING AND CHECKING AUTHENTICATION DATA BETWEEN A PORTABLE TRANSPONDER DEVICE AND A VEHICLE READER UNIT

This application claims priority from European Patent Application No. 05100803.5 filed Feb. 4, 2005, the entire disclosure of which is incorporated herein by reference The invention concerns a method for communicating and checking wireless authentication data between a transponder device and a reader unit preferably placed in a vehicle. The transponder device includes in particular a logic circuit, a memory, a module for transmitting and receiving data signals and an encryption and/or decryption circuit, whereas the reader unit includes a microprocessor unit, a memory, a random number generator and a module for transmitting and receiving data signals. Thus, authentication data can be exchanged between the personalised transponder device and the corresponding reader unit in order to authorise access to the vehicle.

After having carried out all the necessary authentication or identification operations, the transponder device is able to control certain functions of the vehicle. These functions can be, for example, controlling the locking or unlocking of the vehicle's doors and/or windows, starting the vehicle, a vehicle immobilising function, or other commands.

Wireless data transmission or communication via electromagnetic signals between a transponder device and a reader unit placed in a vehicle is well known. The signals may be low frequency or radio-frequency signals.

Usually in a simple authentication mode between a transponder and a reader, the reader first transmits to the transponder, once the latter has been activated, an interrogation signal which can comprise data relating to a random number with m bits, for example 56 bits, followed by encrypted data with n bits, for example 28 bits. The transponder receives and demodulates the data signal. The transponder can decrypt encrypted data to be checked and perform a continuous encryption operation to obtain other encrypted data on the basis of a secret key and the received random number. After verifying the received encrypted data, the transponder transmits the other encrypted data to the reader so that they can be checked in the reader. Once all the verifications have been successfully carried out, the transponder can control different functions of the vehicle.

The number of transmitted random number bits and the number of encrypted data bits are usually set for communicating and checking authentication data. A period of time is more or less determined for this authentication procedure, which may also be a function of the distance separating the two units.

Normally, in order to be able to exchange authentication data with the vehicle reader unit, the transponder device must not be too far from the vehicle. Generally, the exchanged signal carrier frequency is a low frequency for example close to 125 kHz. For this reason, the transponder device must not be further than 2 to 3 m from the vehicle in order to execute one or several commands after authentication.

Several of the encryption algorithms usually used have the drawback of being relatively complex to implement in the reader unit and mainly in the transponder device, which is generally of the passive type. The authentication method checking period is therefore relatively long.

It is a main object of the present invention to provide a wireless authentication data communication and checking method between a transponder device and a reader unit by using a simplified and easy to configure encryption and/or decryption and transmission method.

The present invention therefore concerns a method for communicating and checking wireless authentication data according to the features of independent claims 1 and 8.

Advantageous features of the invention are defined in dependent claims 2 to 7.

One advantage of the authentication data communication and checking method is that the transponder device and the reader unit can be configured so that the length of the authentication data to be transmitted can be adapted. Data length is defined by a determined number of bits. A determined number of bits can be defined for the transmission of one or several random numbers, and an equivalent or different number of bits for the transmission of encryption functions based on the generated random number(s).

Figure 2:
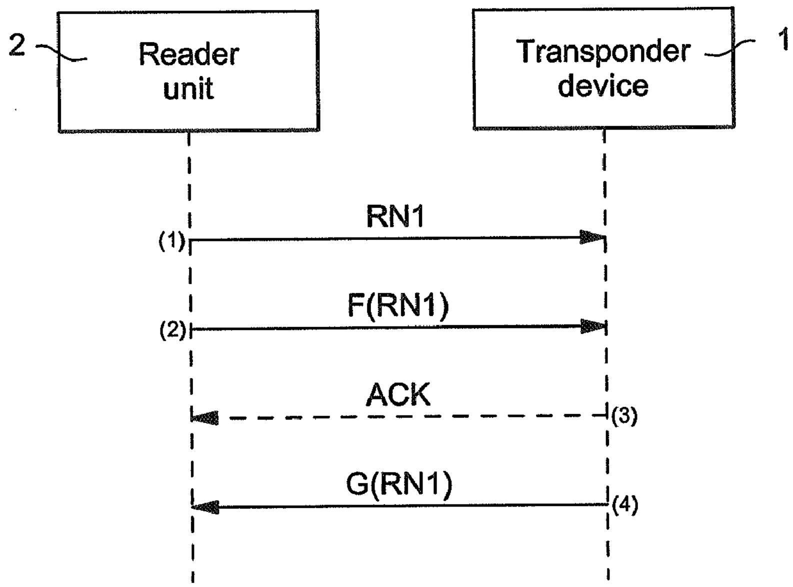
Figure 3:
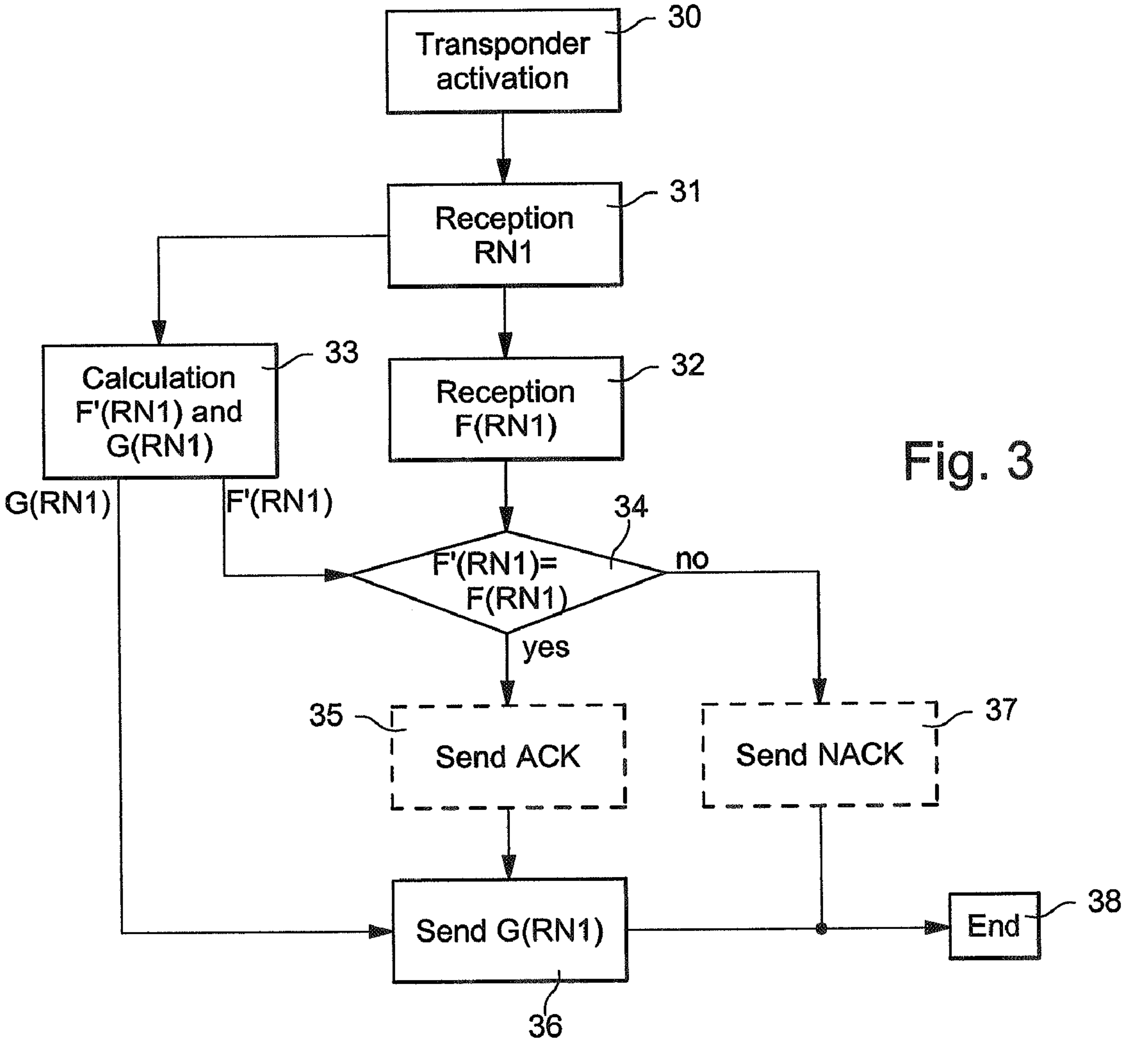
Figure 4:
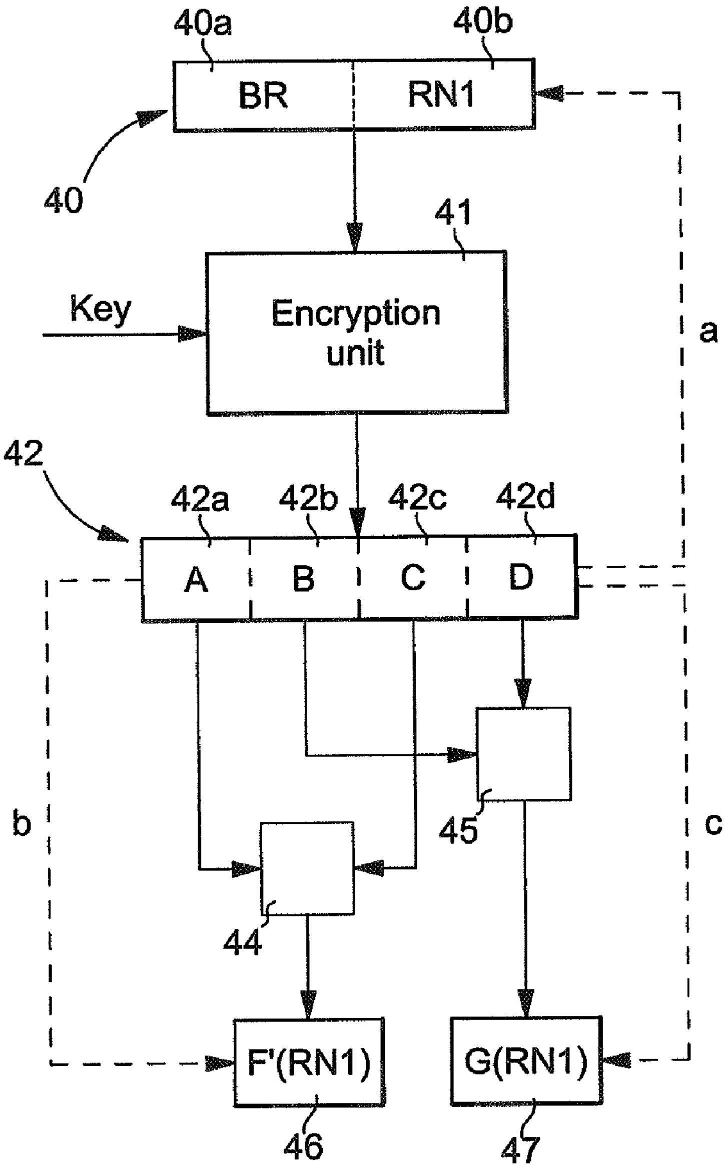
Figure 5:
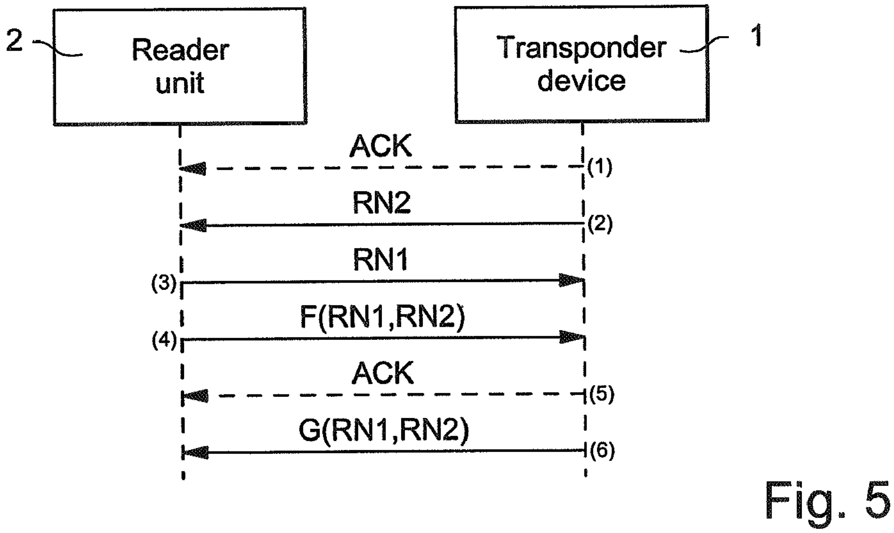
Figure 6:
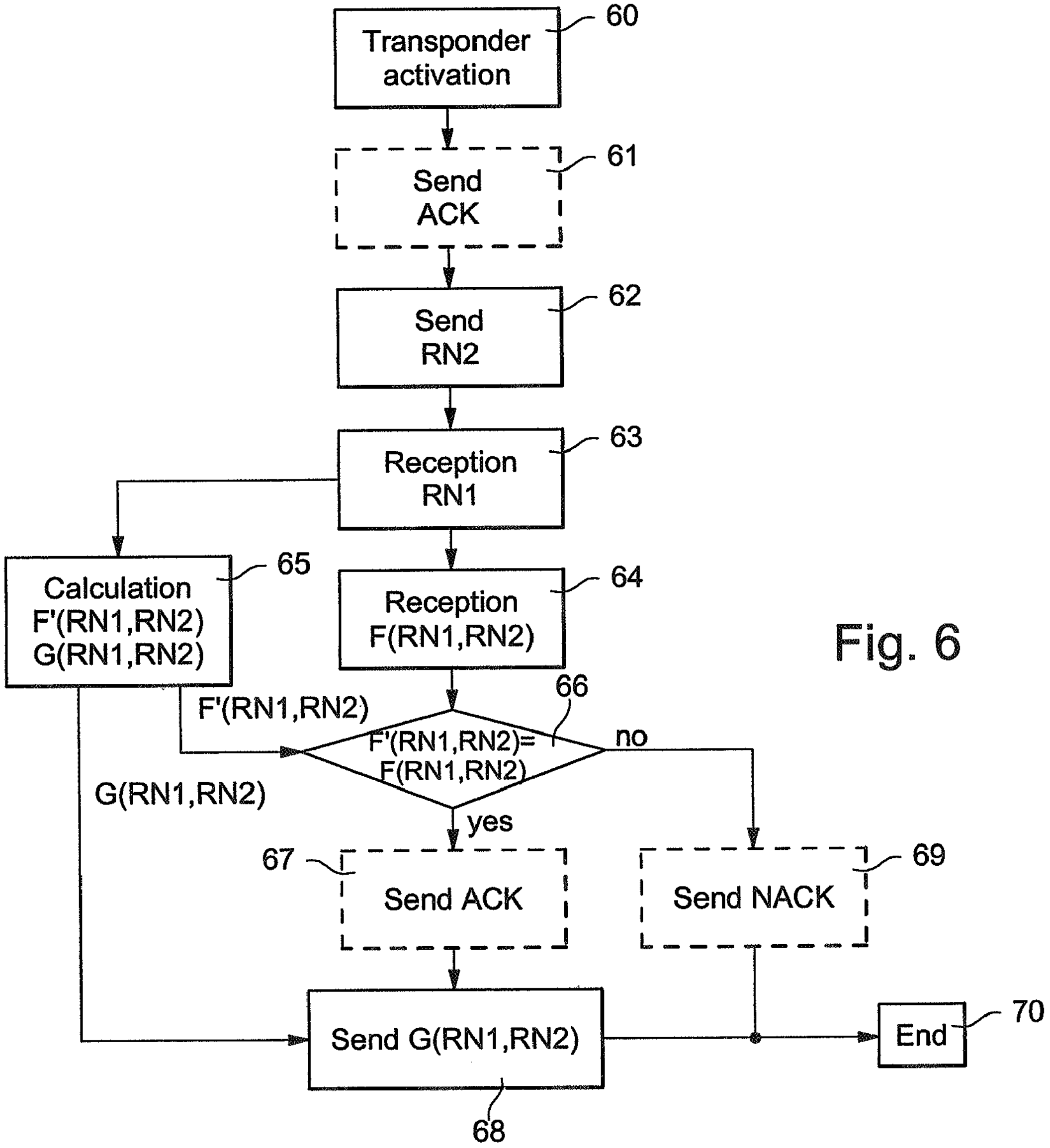
Figure 7:
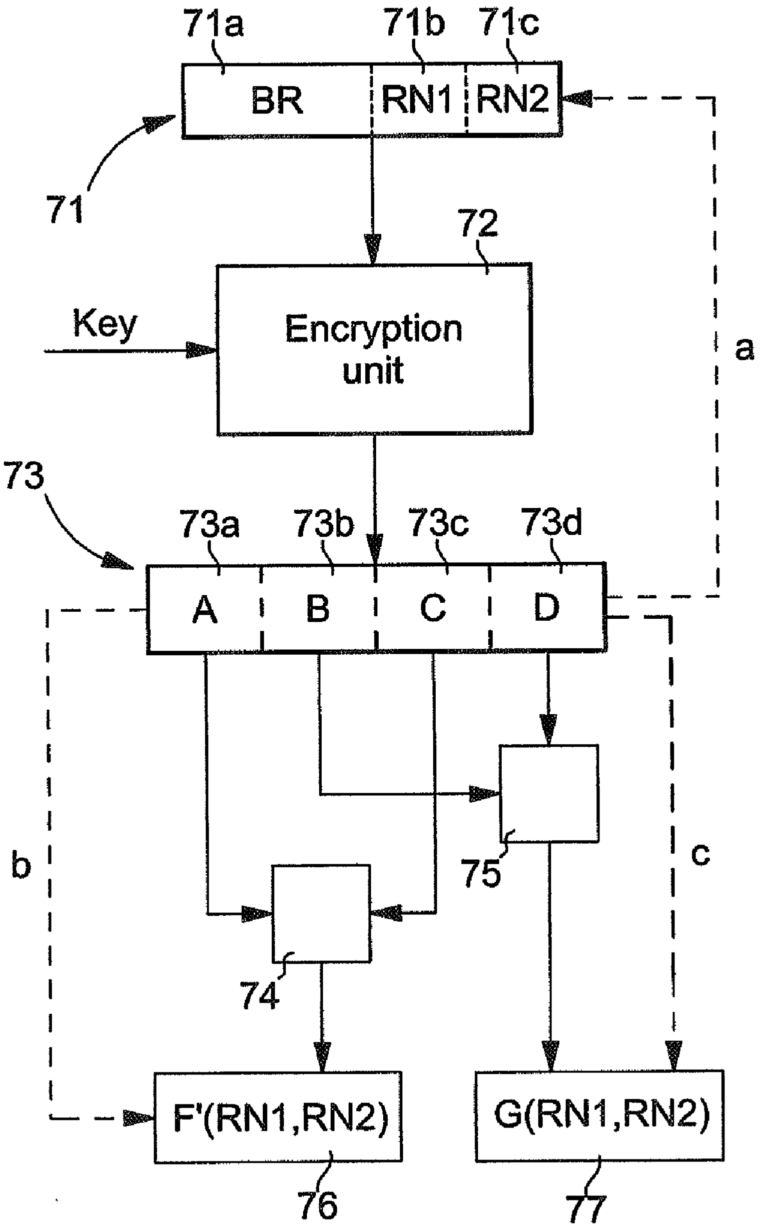

The objects, advantages and features of the authentication data communication and checking method between a transponder and a vehicle reader unit will appear more clearly in the following description of non-limiting embodiments of the invention in conjunction with the drawings, in which:

FIG. 1 shows, in a simplified manner, electronic components of a portable transponder device and of a reader unit for authentication operations for implementing the method according to the invention, FIG. 2 shows, in a simplified manner, data exchanged between the transponder device and the reader unit in a simple authentication mode of the method according to the invention, FIG. 3 shows, in a simplified manner, authentication steps in the transponder according to a simple authentication mode of the method according to the invention, FIG. 4 shows, in a simplified manner, a portion of a logic circuit and an encryption circuit of the transponder in a simple authentication mode for implementing the method according to the invention, FIG. 5 shows, in a simplified manner, data exchanged between the transponder device and the reader unit in a mutual authentication mode of the method according to the invention, FIG. 6 shows, in a simplified manner, authentication steps in the transponder according to a mutual authentication mode of the method according to the invention, and FIG. 7 shows, in a simplified manner, a portion of a logic circuit and an encryption circuit of the transponder in a mutual authentication mode for implementing the method according to the invention.

The following description relates to a wireless method for communicating and checking authentication data between a transponder device and a reader unit placed in a vehicle for authorising access to the vehicle after checking. It is to be noted that those electronic components of the portable transponder device and the reader unit for implementing the method, which are well known to those skilled in the art in this technical field, will not be explained in detail.

The access authorization concerns locking or unlocking the doors or windows of the vehicle, control of the headlights, starting the vehicle, control of an alarm or vehicle immobiliser, control of the horn, reading various vehicle parameters or other commands or functions. The signals are preferably low-frequency signals (125 kHz) for short-range communication, for example in an area of 2 to 3 m between the transponder device and the reader unit. In this case, the transponder can be of the passive type, i.e. it can be electrically powered by signals transmitted by the reader unit.

Of course, one could also envisage using short-range radio-frequency signals (434 MHz) to establish this communication. However, increased electric power consumption is observed with such signals, which would necessitate the use of an active type of transponder.

FIG. 1 shows, in a simplified manner, a transponder device 1 able to establish communication with a reader unit 2 for implementing the method according to the invention when the device is in a determined area around the reader unit. For this purpose, the portable transponder device 1 can be a badge, a ring, a wristwatch, a belt, a portable phone or any other easily transportable small object.

The portable transponder device 1 essentially includes a logic circuit 11, which defines a state machine or a hard-wired logic, for managing the various operations carried out in the transponder. The transponder device 1 further includes, linked to the logic circuit 11, an encryption and/or decryption circuit 12, a non-volatile memory 13 for example of the EEPROM type, a transmission and reception module 14 for data signals $S_D$ which are transmitted and received by an antenna 16 connected to said module 14, and a random number RN2 generator 15. Data signals can include coded and public data. In a simple authentication mode of the device and the reader unit for the method according to the invention, the random number generator 15 of transponder device 1 can be omitted, as shown in dotted lines in FIG. 1.

The encryption and/or decryption circuit 12, which will be explained in more detail in particular with reference to FIGS. 4 and 7, is preferably configured as an encryption circuit by logic circuit 11 and parameters stored in the EEPROM memory 13. This configured encryption circuit enables a random number to be encrypted in blocks via a secret encryption key stored in the memory 13 in order to obtain an encrypted function on the basis of the random number. Each bloc to be encrypted in encryption circuit 12 represents a determined number of the random number bits. The encryption algorithm can for example be of the DES type, which is well known in this technical field.

The reader unit 2 mainly includes a microprocessor unit 21 for software processing of all the operations carried out in the reader unit. The reader unit 2 further includes, linked to the microprocessor unit 21, a data and/or parameter memory 22, a random number RN1 generator 24, and a transmission and reception module 23 for data signals $S_D$ which are transmitted and received by an antenna 25 connected to said module 23. Data signals $S_D$, which comprise data modulated on a carrier frequency, are demodulated in module 23 so that microprocessor unit 21 can process the demodulated data in a known manner.

EEPROM memory 13 of transponder device 1 can store one or several random numbers, for example of 128 bits each, one or several secret encryption keys, various configuration parameters, and other data in certain memory positions. The configuration parameters, which can be introduced either at the end of the transponder device manufacturing steps, or during use of the transponder device, concern, for example, the configuration of the logic circuit 11 so as to determine the length of authentication data to be exchanged with the reader unit.

This data length is defined as a determined number of bits to be transmitted, which may be transmission of a generated random number or a calculated function relating to the generated random number. This number of bits is preferably a multiple of 8. In this way, transponder device 1 can be configured for transmitting a data length of 32 bits, 64 bits, 96 bits or 128 bits, which constitutes a main characteristic of the method according to the invention, as explained in the following description.

Of course the length of each data packet to be exchanged can be chosen to be greater than 128 bits if the transponder is capable of processing binary words greater than 128 bits, for example 196 or 256 bits.

When the personalized transponder device 1, and the corresponding reader unit 2 are configured to exchange data packets whose length is equal to 32 bits, it is possible to speed up the authentication procedure to authorise access to the vehicle more quickly after checking. However, with this data packet length, the security level is lower than with a larger number of bits, but it may nevertheless be deemed sufficient.

The authentication data signals, which are exchanged between the personalised transponder device and the corresponding reader unit, are explained hereafter with reference to FIG. 2. The vehicle access authorisation check by the transponder device can be carried out by a simple authentication method.

Once transponder device 1 has been activated, i.e. switched on based on interrogation signals previously received from reader unit 2, the reader unit generates a random number RN1 and calculates a first encrypted function F(RN1) using a secret key and the generated random number RN1. The reader unit 2 transmits the random number RN1 followed by the first encrypted function F(RN1) to the transponder device 1.

Transponder device 1 demodulates the signal received from the reader unit in its transmission and reception module to remove the received random number and the first received encrypted function. Upon reception of the random number and the first encrypted function, or after validating the first function, the transponder device can transmit a signal ACK validating data reception to the reader unit. However, this step is not always necessary, which is why it is shown in dotted lines in FIG. 2.

After checking the validity of the received encrypted function F(RN1) with the random number RN1, the transponder device calculates a second encrypted function G(RN1) using a secret key equivalent to the reader unit, and the received random number. The reader unit receives and demodulates the coded signal received from the transponder device in order to check the validity of the second encrypted function G(RN1) using the secret key and the generated random number RN1.

In order to better understand the various operations of the authentication method carried out in transponder device 1, reference with be made hereafter to FIG. 3.

As explained above, the transponder device is firstly activated at step 30 before receiving first of all the random number RN1 provided by the reader unit at step 31. This random number is placed in an input register of the transponder device. At step 32 the transponder device receives the first encrypted function F(RN1) which it places in another register.

The transponder device has to be able to recalculate the first encrypted function using a secret key equivalent to the secret key of the reader unit and the received random number. In order to do so, at step 33, the random number RN1 of said input register is sent to an encryption unit of the encryption circuit. This encryption unit receives also the secret key in order to encrypt, in blocks of bits, the binary word from the register, which is formed of the random number of configured dimension and filler bits from the EEPROM memory to completely fill the input register of defined dimension.

The first function F'(RN1) recalculated by the encryption unit is compared, at step 34, to the first received encrypted function F(RN1). If the first two functions are equal, the device can then transmit a correct reception confirmation ACK to the reader unit at step 35. However, if the first two functions do not match, the device can transmit an incorrect reception statement NACK to the reader unit at step 37. However, steps 35 and 37 are not strictly necessary, so they are each shown outlined in dotted lines.

In addition to the first function F'(RN1) recalculated at step 33, a second encrypted function can be also calculated in the transponder device encryption unit. This second encrypted function is momentarily placed in a register before being transmitted to the reader unit, at step 36, but only if the first encrypted functions are equal. After transmission of the second encrypted function G(RN1) at step 36, the authentication method in the transponder device ends at step 38.

With reference to FIG. 4, the elements of the logic circuit and the encryption circuit necessary for calculating the encrypted functions in the transponder device are explained. In FIG. 4 the encryption circuit is essentially formed of an encryption unit 41, an input register 40 and an output register 42.

Upon reception of the random number RN1 from the reader unit, the random number is placed in an encryption circuit input register 40. The input register is of determined dimensions to be able to receive a binary word of, for example, 128 bits. If random number RN1 is formed of a configured lower number of bits for example 32 bits or 64 bits or 96 bits, the input register has to be completed by filler bits BR from the EEPROM memory at the command of the logic circuit. The random number will occupy a portion 40*b* of the input register, and the filler bits BR will occupy a portion 40*a* of input register 40.

Using an encryption algorithm, which can be of the DES type, a bloc encryption operation is carried out in the encryption unit 41 using a secret key Key drawn from the memory. The result of the encryption operation is placed in an output register 42 of equivalent dimensions to the dimensions of the input register. The number of bits contained in the output register 42 is a multiple of 8, for example 128 bits. The number of bits of output register 42 is divided into four groups of bits A, B, C, D placed in four successive portions 42*a*, 42*b*, 42*c*, 42*d* of output register 42. Each group of bits is formed of 32 bits if the output register can include 128 bits.

The first recalculated encrypted function F'(RN 1) placed in a register 46 is obtained by combining the first and third groups of bits A and C of output register 42 through a reduction operator 44 of the logic circuit. The second encrypted function G(RN1) placed in a register 47 is obtained by combining the second and fourth groups of bits B and D of the output register through a reduction operator 45. In this case, the first and second encrypted functions F'(RN1) and G(RN1) include 32 bits.

With different operators or a different number of groups of bits of output register 42, it is possible to configure the desired dimension or length of each encrypted function. For example, to obtain a dimension of 64 bits for each function, using reduction operators, it is possible to combine two pairs of groups of bits of the output register.

Finally, in a configuration in which random number RN1 is formed of 128 bits and the encrypted functions are also formed of 128 bits, the first result of the encryption operation placed in output register 42 gives the first encrypted function F'(RN1). This first encrypted function is placed via path b represented in dotted lines in register 46. In order to calculate the second encrypted function G(RN1), the first recalculated function F'(RN1) replaces the random number in input register 40 represented by path a in dotted lines. The second result of the encryption operation placed in output register 42 gives the second encrypted function G(RN1), which is placed in register 47 represented by path c in dotted lines.

It is clear that it is easy to configure the number of bits of the random number or of each encrypted function for the authentication method according to the invention.

FIGS. 5 to 7 describe different steps of the authentication data communication and checking method between a personalised transponder device 1 and a vehicle reader unit 2. However, unlike the method described hereinbefore, a mutual authentication method is carried out before access to the vehicle is authorised, if the personalised device is recognized. This mutual authentication is achieved on the basis of a first random number generated in the reader unit and of a second random number generated in the transponder device.

As can be seen in FIG. 5, once the transponder device is activated, it can first transmit a signal ACK to inform the reader unit that it has been activated. However, this step, as previously shown in dotted lines, is not indispensable. The transponder device generates a second random number RN2, which it transmits to the reader unit. Upon reception of the second random number RN2, reader unit 2 transmits a first random number generated in the reader unit, and a first encrypted function F(RN1, RN2) obtained using a secret key and the two random numbers RN1 and RN2 to the transponder device 1.

Upon reception of the first random number RN1 and the first encrypted function F(RN1,RN2), the device has to calculate the same first encrypted function. If the two first encrypted functions are equal, a second encrypted function G(RN1,RN2) is calculated with the same secret key and the two random numbers RN1 and RN2. This second encrypted function is transmitted to the reader unit so as to enable it to find the second function in order to end the authentication method and to authorize access to the vehicle.

FIG. 6 shows the various steps of the authentication method in the transponder device.

After activating the transponder device at step 60, a signal ACK can be transmitted to the reader unit at step 61 to announce activation of the transponder device, and a second random number generated in the device is transmitted to the reader unit at step 62. However, step 61 is not strictly necessary, which is why it is shown outlined in dotted lines.

The transponder device receives the first random number RN1 from the reader unit at step 63, and the first encrypted function F(RN1,RN2) at step 64. At step 65, the first encrypted function is recalculated using the two random numbers to give a first recalculated encrypted function F'(RN1,RN2) to compare with the first received encrypted function F(RN1,RN2) at step 66. If the two first encrypted functions are equal, a correct reception confirmation signal ACK can be transmitted at step 67. On the other hand, if the two first encrypted functions are different, an incorrect reception signal NACK can be transmitted at step 69. However, steps 67 and 69 are not strictly necessary, so they are each shown outlined in dotted lines.

In addition to the recalculated first function F'(RN1,RN2) at step 65, a second encrypted function G(RN1,RN2) can be also calculated in the transponder device encryption unit. This second encrypted function is momentarily placed in a register before being transmitted to the reader unit at step 68, but only if the two first encrypted functions are equal. After transmission of the second encrypted function G(RN1,RN2) at step 68, the authentication method in the transponder device ends at step 70.

FIG. 7 shows elements equivalent to elements of the logic circuit and the encryption circuit described in FIG. 4. Consequently, only the main differences are explained hereafter.

As two random numbers RN1 and RN2 are generated, they are placed in the same input register 71, which includes a portion 71*a* for filler bits, a portion 71*b* for the first random number RN1 and a portion 71*c* for the second random number RN2. Preferably, each random number is formed of 32 bits, whereas input register 71 can include 128 bits.

A bloc encryption operation is carried out in encryption unit 72 using a secret key and the input register bits. The encryption result is placed in an output register 73 divided into four groups A, B, C, D placed successively in portions 73*a*, 73*b*, 73*c*, 73*d* each having 32 bits.

The first recalculated function F'(RN1,RN2) is obtained by combining groups A and C via a reduction operator 74 of the logic circuit and it is placed in register 76. The second encrypted function G(RN1,RN2) is obtained by combining groups B and D through reduction operator 75 of the logic circuit and it is placed by a sequential output in register 77. In this case, the encrypted functions are each formed of 32 bits.

Of course, as explained with reference to FIG. 4, a different configuration can be used to obtain encrypted functions with 64 bits or 128 bits, without it being necessary to explain again how to obtain such functions.

In a variant that is not illustrated, one could envisage for example configuring the transponder device such that the encryption and/or decryption circuit is also configured for decrypting an encrypted function. In order to do this, the previously described encryption unit has to be able to carry out a reverse operation, which consists in decrypting an encrypted function using the secret key in order to find the random number that was used for calculating the encrypted function.

Before generating a second encrypted function in the transponder device, a comparison can be made between the first random number received from the reader unit with a first random number recalculated in the decryption circuit from the first encrypted function. If the two first random numbers are equal, the second encrypted function can be transmitted to the reader unit.

From the description which has just been given, multiple variants of the authentication data communication and checking method can be conceived by those skilled in the art, without departing from the scope of the invention defined by the claims. The number of bits, which forms either each random number or each encrypted function, could be configured automatically during the establishment of communication between the transponder device and the reader unit. Both a received random number and a received encrypted function could be checked in the device and/or the reader unit.

What is claimed is:

1. A method for communicating and checking wireless authentication data between a transponder device and a reader unit placed in particular in a vehicle in order to authorize access to said vehicle, said transponder device comprising a logic circuit, a non-volatile memory, an encryption and/or decryption circuit and a first module for transmitting and receiving data signals, said reader unit comprising a microprocessor unit, a memory, a random number generator able to provide a first random number to the microprocessor unit, and a second module for transmitting and receiving data signals, said method including steps of:

a) transmitting a data signal including a first random number generated in the reader unit, the number of bits of said random number to be transmitted being configured in a first length chosen among a certain number of determined lengths according to configuration parameters for transmission, and a first encrypted function based on a secret key and the first random number, the number of bits of said first encrypted function being configured in a second length chosen among a certain number of determined lengths for transmission, b) receiving and demodulating data signals transmitted by the reader unit in the transponder device, c) calculating a new first encrypted function in the transponder device based on the first received random number and a secret key stored in the non-volatile memory corresponding to the secret key of the reader unit, the new first encrypted function being calculated in the encryption circuit using a bit bloc encryption algorithm, d) comparing the new first encrypted function with the first received encrypted function, e) transmitting to the reader unit a second encrypted function obtained on the basis of the first random number and the secret key in the encryption circuit, solely if the new first encrypted function is equal to the first received encrypted function, the number of bits of the second encrypted function being configured by the logic circuit according to configuration parameters from memory in a third length chosen among a certain number of determined lengths for transmission, and f) checking the validity of the second encrypted function received in the reader unit in order to authorize access to the vehicle, wherein the first random number received in the transponder device is placed in an input register of the encryption circuit, which is of defined dimensions, for example 128 bits, greater than or equal to the configured length of the first random number, a certain number of filler bits from the non-volatile memory being placed in the input register in order to complete said register to enable an encryption unit to encrypt the binary word of the input register in blocks.

2. The method according to claim 1, wherein the length of each data packet exchanged between the transponder device and the reader unit is formed of a number of bits, which is a multiple of 8.

3. The method according to claim 2, wherein the length of each data packet to be transmitted can be configured as required in 32 bits, 64 bits, 96 bits or 128 bits in order to speed up the authentication data exchange the shorter the length of each data packet.

4. The method according to claim 1, wherein a data reception confirmation signal is transmitted from the transponder device to the reader unit upon reception of the data signal from the reader unit, or after comparison between the first encrypted function and the new first encrypted function.

5. The method according to claim 1, wherein the encryption unit sends an encryption result into an output register which is of defined dimensions, for example 128 bits, said output register being divided into four successive groups of bits, and wherein the new first encrypted function and the second encrypted function are produced by different combinations of groups of bits from the output register via a respective operator of the logic circuit, the configured lengths of the first and second encrypted functions being equal.

6. The method according to claim 1, in which the transponder device includes another random number generator able to produce a second random number, wherein before step a), the transponder device transmits the second random number to the reader unit, wherein the reader unit calculates and transmits a first encrypted function on the basis of a secret key and the first and second random numbers, wherein in step c), a new first encrypted function is calculated in the transponder device using the first and second random numbers and a secret key corresponding to the secret key of the reader unit, and wherein in step e), the transponder device transmits to the reader unit a second encrypted function obtained on the basis of the first and second random numbers and the secret key in the encryption circuit, but solely if the new first encrypted function is equal to the first received encrypted function.

7. A method for communicating and checking wireless authentication data between a transponder device and a reader unit placed in particular in a vehicle in order to authorize access to said vehicle, said transponder device comprising a logic circuit, a non-volatile memory, an encryption and/or decryption circuit and a first module for transmitting and receiving data signals, said reader unit comprising a microprocessor unit, a memory, a random number generator able to provide a first random number to the microprocessor unit, and a second module for transmitting and receiving data signals, said method including steps of:

a) transmitting a data signal including a first random number produced in the reader unit, the number of bits of said random number to be transmitted being configured in a first length chosen among a certain number of determined lengths according to configuration parameters, and a first encrypted function on the basis of a secret key and the first random number, the number of bits of said first encrypted function being configured in a second length chosen among a certain number of determined lengths for transmission, b) receiving and demodulating data signals transmitted by the reader unit in the transponder device, c) decrypting the first encrypted function in the configured decryption circuit using a secret key stored in the non-volatile memory corresponding to the secret key of the reader unit to obtain a new first random number, d) comparing the new first random number with the first received random number, e) transmitting to the reader unit a second encrypted function obtained on the basis of the first random number and the secret key in the encryption circuit, solely if the new first encrypted function is equal to the first received encrypted function, the number of bits of the second encrypted function being configured by the logic circuit according to configuration parameters from memory in a third length chosen among a certain number of determined lengths, and f) checking the validity of the second encrypted function received in the reader unit in order to authorize access to the vehicle, wherein the first random number received in the transponder device is placed in an input register of the encryption circuit, which is of defined dimensions, for example 128 bits, greater than or equal to the configured length of the first random number, a certain number of filler bits from the non-volatile memory being placed in the input register in order to complete said register to enable an encryption unit to encrypt the binary word of the input register in blocks.

* * * * *